Aug. 29, 1967 D. L. LOCKWOOD 3,338,617
RESTYLING SHELL FOR AUTOMOBILE BODIES
Filed Feb. 15, 1965
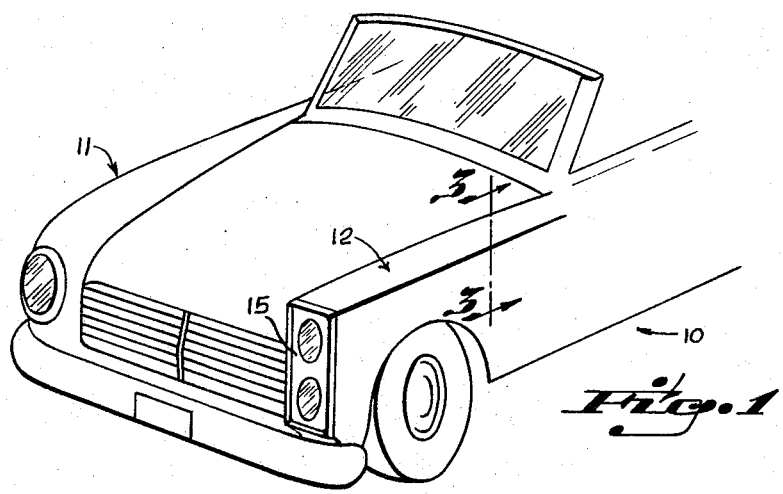
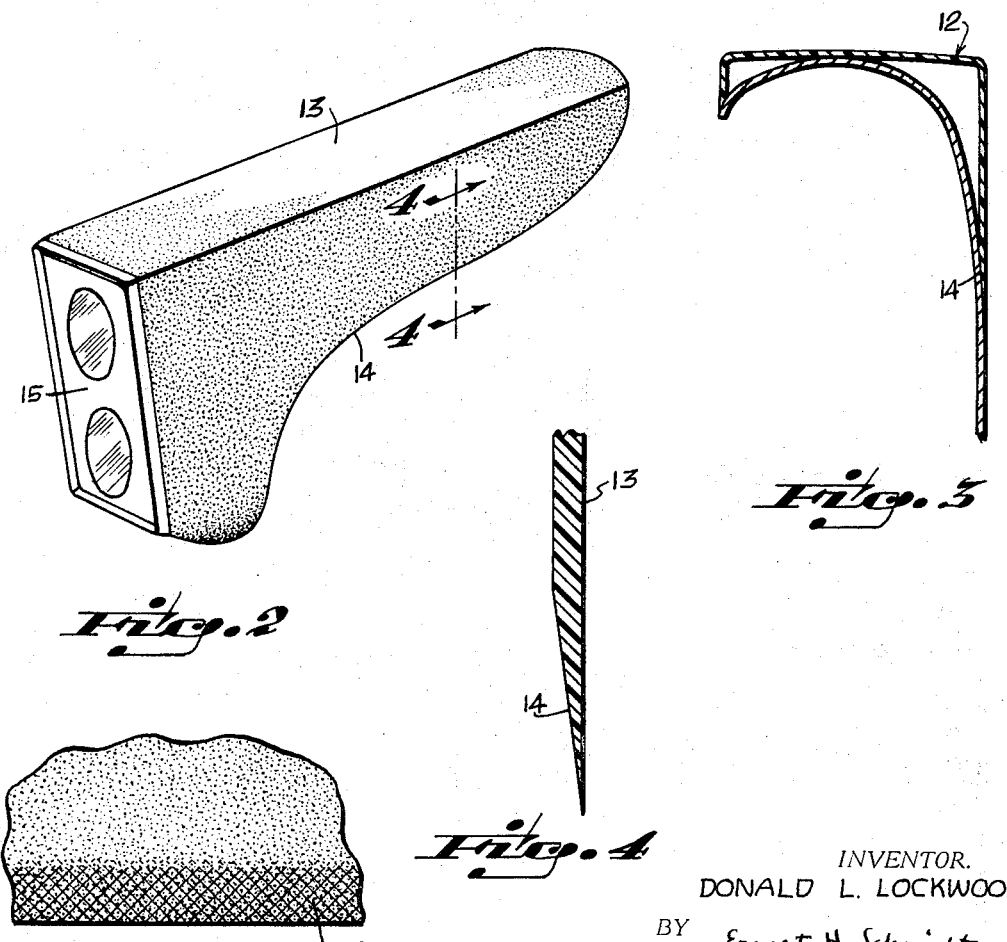
INVENTOR.
DONALD L. LOCKWOOD
BY Ernest H. Schmidt
ATTORNEY.

3,338,617
RESTYLING SHELL FOR AUTOMOBILE BODIES
Donald L. Lockwood, 2040 NW. 17th St.,
Miami, Fla. 33125
Filed Feb. 15, 1965, Ser. No. 432,742
2 Claims. (Cl. 296—1)

My invention relates to vehicle bodies, particularly automobile body shapes, and is directed to restyling shells for the custom restyling of factory run automobile body designs or shapes.

It is common practice in the automobile industry to restyle the body shape of each yearly model to artificially create obsolescence in style and thereby stimulate new car sales. Usually the changes from year to year are minor, and are directed for the most part to variations in shape at the corners of the four quarter panels comprising the body, the areas that usually include the head lamp and tail light assemblies of the vehicle. However, since automobile depreciation is greatest during the first year, decreasing rapidly, percentage-wise, during subsequent years, it is generally economically unsound and costly to purchase a new car every year just to be up-to-date in car body style. It is accordingly the principal object of my invention to provide restyling shells that can readily be applied to various areas of old model automobile bodies to up-date their styling, and thereby simulate new car appearance at low cost.

Another object is to provide restyling shells, which may be in kit form, for restyling a particular automobile make, year and model, or a group of various makes, years and models, to new car appearance, and which comprises individual concave, shell-like members of pre-formed style or design and having somewhat resilient edge portions adapted to be form fitted for blending in with the shape of an automobile body at peripheral zones surrounding areas to which the shells are applied for restyling.

A more particular object is to provide a restyling shell of the above nature which can readily be fabricated and formed of a synthetic plastic material, reinforced with glass fiber or the like, and which can be smoothly bonded at its peripheral edge to a given area of a car body to simulate unitary construction thereat in restyled shape.

Yet another object is to provide a restyling shell of the character described that lends itself well to the inclusion of automobile head lamps or tail lights, so as to be suited for restyling of automobile body quarter panel zones including head lamp and tail light areas.

Still another object is to provide a restyling shell of the above nature that is well adapted to custom styling to produce unique body appearance in otherwise standard make automobiles.

Yet another object is to provide a restyling shell of the above nature that is simple in structure, economical in cost, easy to install, and strong and durable in use.

Other objects, features and advantages of the invention will be apparent from the following description when read with reference to the accompanying drawings. In the drawings, wherein like reference numerals denote corresponding parts throughout the several views:

FIG. 1 is a fragmentary view illustrating, in perspective, the front end of an automobile, the left front fender of which is restyled by application of a restyling shell embodying the invention;

FIG. 2 illustrates separately and on an enlarged scale the restyling shell member before assembly to an automobile body as in FIG. 1;

FIG. 3 is a cross-sectional view taken along the line 3—3 of FIG. 1 in the direction of the arrows illustrating how the peripheral edge of the restyling shell fits over and is bonded to the restyled front fender to produce a smooth juncture therewith simulating unitary construction in the restyled fender;

FIG. 4 is a vertical section taken on line 4—4 of FIG. 2, on an enlarged scale, and FIG. 5 is a fragmentary view of a peripheral edge portion of a restyling shell illustrating a modification thereof wherein the peripheral edge is of half-cured polyester resin for increased flexibility at the bonding edge to facilitate attachment to a vehicle body.

Referring now in detail to the drawings, 10 designates an automobile having an original front fender style shown by the right front fender 11, and a restyled left front fender 12 achieved by use of a restyling shell embodying my invention. The numeral 13 in FIG. 2 illustrates, separately, the restyling shell used in restyling the left front fender of the automobile illustrated in FIG. 1. The restyling shell 13 is preferably molded of a reinforced synthetic plastic, for strength, limited resilience, economy and ease of manufacture, handling and application. The restyling shell may conveniently be made of glass cloth reinforced polyester resin by known laminating or "laying-up" techniques combining woven glass cloth with the resin, and curing to hardness by use of a catalyst. The resulting shell can be sanded and polished to a smooth finish which, when painted, will be indistinguishable from the metal of the automobile body to which it is applied. Preferably, the peripheral edge of the restyling shell is beveled or feathered at the inside to a very narrow edge, as illustrated at 14 in FIGS. 3 and 4, so that it smoothly fits against the automobile body at the zone of attachment thereto. Bonding in place is preferably accomplished by an epoxy resin. After hardening of the epoxy resin bond, the bonding zone will be sanded so that the line of juncture is completely smoothed. Painting of the vehicle thereafter results in a restyled fender shape indistinguishable from one-piece metal construction.

It is to be noted that a redesigned head lamp assembly 15 is molded in the restyling shell member 13 described above and illustrated in the drawings. While the most dramatic change in appearance or body styling can usually be made in the quarter panel zones embodying the head lamps or tail lights, since the lamp or light assembly designs can also be restyled along with body shape, it is to be understood that restyling shell members could also be used independently of such lamps or lights, depending upon the original styling of the vehicle to be restyled, and the restyling effect desired.

FIG. 5 illustrates a modification of the invention wherein the marginal edge portion about the periphery of a restyling shell embodying the invention is left half-cured, as indicated at 16, by the application of less hardening agent or catalyst in the molding process. This results in increased resiliency in the area of juncture of the shell member with the vehicle body to facilitate achieving a smooth flowing juncture in assembly, particularly in instances where there is considerable curvature at the juncture.

The primary advantage of my invention resides in the fact that by use of my preformed shells, any particular make or model car can be restyled easily and at low cost to simulate new model automobile styling trends in an old automobile. In addition, restyling shells of unique design can be produced for custom restyling of automobiles, whether old or new, for sports car enthusiasts and others desiring the unusual in automobile appearance. It will be understood that in practice, the restyling shells will ordinarily be supplied in kits of two or more of a design and shape to fit a particular automobile body model, or a limited group of automobiles having similar or nearly similar body styles.

While I have illustrated and described herein only two forms in which my invention can conveniently be embodied in practice, it is to be understood that these forms are presented by way of example only, and not in a limiting sense. For example, instead of the use of glass fiber as a reinforcing agent, other suitable materials including wire mesh could be substituted.

What I claim as new and desire to secure by Letters Patent is:

1. A restyling shell for automobile bodies comprising, a thin, concave, substantially rigid member of predetermined form having a peripheral edge conforming generally to the contour of an automobile body at a particular zone thereof, said concave member being molded of a polyester resin reinforced with woven glass fiber, an integral marginal edge portion about the periphery of said concave member being comparatively soft and resilient to facilitate smooth bonding to an automobile body.

2. A restyling shell for automobile bodies comprising, a thin, concave, substantially rigid member of predetermined form having a peripheral edge conforming generally to the contour of an automobile body at a particular zone thereof, said concave member being molded of a polyester resin reinforced with woven glass fiber, and an electrical lamp assembly secured in said concave member and forming a part thereof, an integral marginal edge portion about the periphery of said concave member being comparatively soft and resilient to facilitate smooth bonding to an automobile body.

References Cited

UNITED STATES PATENTS

| | | | |
|---|---|---|---|
| 2,491,800 | 12/1949 | Colaner | 280—152 |
| 2,549,124 | 4/1951 | Oswald | 280—152 |
| 2,553,504 | 5/1951 | Judd | 280—152 X |
| 2,796,286 | 6/1957 | Barenyi | 296—1 X |

FOREIGN PATENTS 500,678   2/1939   Great Britain.

OTHER REFERENCES

Automobile Engineer, "British Plastics," July 1955, p. 289.

BENJAMIN HERSH, *Primary Examiner.*

P. GOODMAN, *Assistant Examiner.*